US000001400H

United States Statutory Invention Registration [19]

[11] Reg. Number: H1400

Culbreath et al.

[43] Published: Jan. 3, 1995

[54] FUNGICIDE

[76] Inventors: Albert K. Culbreath, 2411 Madison Dr., Tifton, Ga. 31794; Henry S. McLean, 170 Old Blackshear Rd., Cordele, Ga. 31015

[21] Appl. No.: 928,551

[22] Filed: Aug. 11, 1992

[51] Int. Cl.[6] ..... A01N 43/64; A01N 37/34
[52] U.S. Cl. ..... 514/383; 514/525
[58] Field of Search ..... 514/383, 525

[56] References Cited

U.S. PATENT DOCUMENTS 4,664,696 5/1987 Schaub ..... 514/383

OTHER PUBLICATIONS

The Merck Index, 10 ed., (1983) p. 305.

*Primary Examiner*—Shean Wu

[57] ABSTRACT

A method of controlling fungi in peanuts employing a triazole fungicide and chlorothalonil.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUNGICIDE

The present invention relates to fungicides. In particular the present invention provides a method for controlling fungal diseases in peanut comprising applying to the peanut plants or their locus in admixture or separately a fungicidally effective aggregate amount of (a) a triazole, 14-α-demethylation inhibitor, fungicide and the compound of formula I

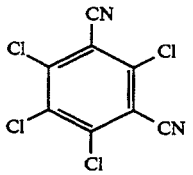

(I)

The triazoles may be in free form or in fungicidally active salt forms. Such salt forms exhibit the same order of activity as the free forms.

Examples of triazole fungicides suitable as active ingredient (a) include cyproconazole, hexaconazole, propiconazole, tebuconazole, etaconazole, penconazole, diclobutrazole, flusilazole, diniconazole, triadimefon, triadimenol, bitertanol, flutriafol and myclobutanil, whereby cyproconazole is particularly preferred.

Cyproconazole which may be named α-chlorophenyl-α-(1-cyclopropylethyl)-1H-1,2,4-triazole-1-ethanol is a known fungicide effective in the combating of fungi in crops such as cereals including rice, especially in wheat and barley; it has excellent activity against rusts (such as Puccinia spp.), good activity against powdery mildews (such as Erysiphe), and interesting suppressive activities against Septoria, Pyrenophora, Rhynchosporium and Pseudocercosporella.

This compound, methods for its production and its use are described in U.S. Pat. No. 4,664,696.

Cyproconazole is usually employed in free base form.

The compound of the formula I, which may be named 2,4,5,6-tetrachlor-1,3-benzene dicarbonitrile has the common name chlorothalonil and is a known fungicide effective against a broad range of plant pathogens on many agricultural and vegetable crops, turf and ornamentals.

Chlorothalonil, its production and use are described in U.S. Pat. Nos. 3,290,353; 3,331,735 and 3,948,636.

It has now been found that use of an active ingredient a) with active ingredient b) is surprisingly effective in combatting soilborne or folial fungal disease of peanut such as leafspot (*Cercosporidium personatum, Rhizoctonia solani, Cercospora arachidicola*), *Puccinia achidis* and southern stem rot (*Sclerotium personatum*). This combined treatment is particularly effective in the control of late leafspot (*Cercosporidium personatum*) of peanut.

Although the efficacy of the combined treatment will depend on a number of environmental factors, tests indicate that the combined treatment is particularly effective and shows synergistic effect. This allows for reduction of the rate of chlorothalonil to less than half the recommended maximum use rate which in combination with usually recommended amounts of triazole e.g. cyproconazole results in improved disease control compared with chlorothalonil alone at the maximum recommended rate.

One advantage of this surprising efficacy is the possibility for enhancing to ability the prevent resistance development by use of multiple fungicides at reduced overall rates.

Co-application can be achieved using tank mixes of preformulated individual active ingredients, simultaneous or sequential application of such formulations or application of preformulated fixed pre-mix combination of the individual active ingredients.

Co-application according to the present invention to the "locus" of the plant includes application to the seeds, the plant itself or parts of the plant, or the soil.

For airborne fungi such as the causative agents of late leafspot the combined treatment is preferably by foliar spray.

As stated above application rates chosen will depend on various factors such as degree of attack, climatic conditions and the like. Optimum usage is readily determinable by one skilled in the art using routine testing.

In general, for example, satisfactory results are obtained when applying the triazole at recommended rates e.g. in the case of cyproconazole at rates of ca 0.01 to 0.1 lbs ai/ac and chlorthalonil at rates of e.g. 0.1 to 0.6 lbs ai/ac.

Although ratios will vary according to disease pressure, suitable weight ratios of triazole to chlorothalonil typically lie in the range of from 1:75 to 1:1 with particularly marked synergism at ratios of 1:9 to 1:4. Combined treatment with a triazole and chlorothalonil is also effective in treating diseases caused by plants.

Where an active ingredient is employed in salt form it will in general be appropriate to adapt the amount of compound employed by a factor equivalent to the molecular weight ratios of the free form and the particular salt form to obtain the desired active ingredient equivalent.

The active ingredients may be formulated either separately or in the form of a pre-mix in conventional manner e.g. as emulsifiable concentrates, wettable powders, dispersible granules and the like e.g. by mixing with appropriate adjuvants such as diluents and optionally other formulating ingredients such as surfactants.

The term diluent as used herein means any liquid or solid agriculturally acceptable material—including carriers—which may be added to the active constituents to bring them in an application or commercial form, respectively, to a usable or desirable strength of activity. It can for example be talc, kaolin, diatomaceous earth, mineral oil, or water.

Particularly formulations to be applied in spraying forms such as water dispersible concentrates or wettable powders may contain surfactants such as wetting and dispersing agents, e.g. the condensation product of formaldehyde with naphthalene sulphonate, an alkylarylsulphonate, a lignin sulphonate, a fatty alkyl sulphate, an ethoxylated alkylphenol and an ethoxylated fatty alcohol.

In general, the formulations include from 0.01 to 90% by weight of active agent, from 0 to 20% agriculturally acceptable surfactant and 10 to 99.99% of diluent, the active agent consisting of the compounds of formula I and II and optionally other active agents.

In addition to the usual diluents and surfactants, the compositions of the invention may comprise further additives with special purposes such as antifoaming agents. Moreover, further fungicides with similar or complementary fungicidal activity, e.g. tridemorph, fenpropimorph, fenpropidin, pyrazolphos, prochloraz, macozeb, sulphur and carbendazim, or other beneficially-acting materials, such as insecticides may be present in the formulation.

Concrete forms of compositions in general contain between about 2 and 80% preferably between about 5 and 70% by weight of active agent. Application forms of formulation may for example contain from 0.01 to 45% by weight.

The invention is illustrated by the following example.

FORMULATION EXAMPLE

| Ingredient | Weight % |
|---|---|
| Cyproconazole (93%) | 5.00 |
| Chlorothalonil (97%) | 37.76 |
| Attagel | 2.00 |
| Reax 45A | 5.00 |
| Pluronic P105 | 2.00 |
| Emulphor CO | 0.50 |
| Ethylene glycol | 5.00 |
| Water | 42.74 |

FIELD TEST

Peanuts (*Arachis hypogaea* "Florunner") were planted in a field of Tifton loamy sand (pH 5.8) at the Coastal Plain Experiment Station Gibbs Farm, Tifton, Ga. on 21 May and in a field of Greenville sandy clay (pH 5.8) at the Southwest Georgia Branch Station, Plains, Ga. on 23 May. Plots consisted of one bed (2 rows, 6 ft×25 ft), and were separated laterally by two nonsprayed border rows and longitudinally by 8 ft fallow alleys. Experimental design was a randomized complete block, with four replications. Treatments at both locations consisted of all possible combinations of six rates of cyproconazole applied as Alto® 100SL (0, 0.11, 0.21, 0.43, 0.64 and 0.85 pt/A) and four rates (0, 0.25, 0.50, and 0.75 pt/A) of chlorothalonil applied as Bravo ®720 6F (ISK Corp.). Combinations of the two materials were applied as tank mixes. Seven applications were made using a 14 day schedule, with initial sprays on 20 June at Tifton and 18 June at Plains. Fungicides were applied using a pull-cart mounted spray boom. The boom was equipped with three D2-13 hollow cone spray nozzles per row. Fungicides were diluted in 12.5 gal/A of water and applied at 52 PSI. Final visual assessments for leaf spot were made on 26 September at Tifton and 27 September at Plains. Treatments were evaluated by visual estimates of severity (percent of leaflets with one or more leafspot lesion) and leafspot ratings (Florida 1-10 scale, were 1=no leafspot, 10=dead plants, completely defoliated by leafspot). Percent control was calculated based upon leafspot severity. Plots were inverted,and southern stem rot incidence was determined on 26 September at Tifton and 27 September at Plains. Plots were harvested mechanically on 9 October at Tifton and 4 October at Plains. Data from the two locations were analyzed independently by analysis of variance, and Fisher's protected least significant difference (LSD) values were calculated for mean separations.

Late leafspot was the predominant foliar disease observed, but early leafspot was abundant. Leafspot pressure was severe. Significant chlorothalonil×cyproconazole interactions occurred for leafspot severity, percent control and Florida scale ratings.

TABLE 1

| | Leafspot Evaluation | | | | | | | | | |
|---|---|---|---|---|---|---|---|---|---|---|
| | Severity[1] | | % Control[2] | | Fla Scale[3] | | Stem rot[4] | | Yield lb/A | |
| Treatment, rate | T/5 | P | T | P | T | P | T | P | T | P |
| Nontreated Control | 100 | 100 | — | — | 9.5 | 9.0 | 25.8 | 22.0 | 1961 | 1765 |
| Alto ® 100 SL 0.11 pt | 98 | 91 | 2 | 9 | 6.8 | 5.8 | 12.3 | 8.0 | 4045 | 3955 |
| Alto ® 100 SL 0.21 pt | 71 | 55 | 19 | 45 | 4.5 | 3.8 | 8.0 | 7.0 | 4372 | 4054 |
| Alto ® 100 SL 0.43 pt | 20 | 52 | 80 | 48 | 2.1 | 3.6 | 10.8 | 3.0 | 4413 | 4487 |
| Alto ® 100 SL 0.64 pt | 20 | 20 | 80 | 80 | 2.1 | 2.1 | 5.0 | 5.3 | 4372 | 4397 |
| Alto ® 100 SL 0.85 pt | 21 | 20 | 79 | 80 | 2.2 | 2.1 | 4.5 | 1.8 | 4658 | 4470 |
| Bravo 720 0.25 pt | 100 | 100 | 0 | 0 | 8.2 | 7.4 | 13.8 | 13.3 | 3228 | 2787 |
| Bravo 720 0.50 pt | 96 | 98 | 4 | 2 | 5.9 | 6.5 | 25.8 | 14.5 | 2574 | 2869 |
| Bravo 720 0.75 pt | 32 | 81 | 68 | 19 | 4.0 | 5.0 | 17.5 | 11.8 | 3309 | 3326 |
| Alto ® 100 SL 0.11 pt + Bravo 720 0.25 pt | 84 | 74 | 16 | 16 | 5.1 | 7.4 | 12.3 | 9.5 | 3759 | 3457 |
| Alto ® 100 SL 0.11 pt + Bravo 720 0.50 pt | 60 | 36 | 40 | 64 | 4.0 | 2.9 | 13.0 | 10.5 | 3841 | 3588 |
| Alto ® 100 SL 0.11 pt + Bravo 720 0.75 pt | 6 | 20 | 94 | 80 | 2.7 | 2.1 | 12.3 | 6.5 | 3881 | 3498 |
| Alto ® 100 SL 0.21 pt + Bravo 720 0.25 pt | 63 | 45 | 37 | 55 | 4.1 | 3.3 | 11.5 | 6.3 | 4086 | 3947 |
| Alto ® 100 SL 0.21 pt + Bravo 720 0.50 pt | 20 | 37 | 80 | 63 | 2.1 | 2.9 | 11.5 | 6.8 | 4004 | 4111 |
| Alto ® 100 SL 0.21 pt + Bravo 720 0.75 pt | 16 | 2 | 84 | 98 | 1.9 | 1.3 | 13.3 | 8.0 | 3718 | 3783 |
| Alto ® 100 SL 0.43 pt + Bravo 720 0.25 pt | 25 | 1 | 75 | 99 | 2.4 | 1.2 | 7.3 | 4.3 | 4413 | 4544 |
| Alto ® 100 SL 0.43 pt + Bravo 720 0.50 pt | 8 | 22 | 92 | 78 | 1.6 | 2.3 | 7.5 | 5.5 | 4209 | 4062 |
| Alto ® 100 SL 0.43 pt + Bravo 720 0.75 pt | 3 | 1 | 97 | 99 | 1.4 | 1.3 | 5.3 | 3.0 | 4331 | 4331 |
| Alto ® 100 SL 0.64 pt + Bravo 720 0.25 pt | 8 | 0 | 92 | 100 | 1.6 | 1.2 | 6.0 | 4.0 | 4617 | 4340 |
| Alto ® 100 SL 0.64 pt + Bravo 720 0.50 pt | 5 | 9 | 95 | 91 | 1.4 | 1.7 | 7.8 | 1.8 | 4617 | 4707 |
| Alto ® 100 SL 0.64 pt + Bravo 720 0.75 pt | 5 | 25 | 95 | 75 | 1.6 | 2.4 | 7.0 | 5.5 | 4372 | 4135 |
| Alto ® 100 SL 0.85 pt + Bravo 720 0.25 pt | 6 | 10 | 94 | 90 | 1.5 | 1.7 | 4.3 | 3.5 | 4331 | 4716 |
| Alto ® 100 SL 0.85 pt + Bravo 720 0.50 pt | 1 | 2 | 99 | 98 | 1.2 | 1.2 | 3.8 | 3.5 | 4740 | 4438 |
| Alto ® 100 SL 0.85 pt + | 4 | 6 | 96 | 94 | 1.4 | 1.4 | 3.8 | 3.5 | 4601 | 4535 |

TABLE 1-continued

| Treatment, rate | Severity[1] | | Leafspot Evaluation % Control[2] | | Fla Scale[3] | | Stem rot[4] | | Yield lb/A | |
|---|---|---|---|---|---|---|---|---|---|---|
| | T/5 | P | T | P | T | P | T | P | T | P |
| Bravo 720 0.75 pt | | | | | | | | | | |
| LSD (P ≦ 0.05) | 21 | 23 | 21 | 23 | 1.2 | 1.2 | 7.9 | 4.8 | 688 | 637 |

[1]Percent of leaflets with one or more leafspot lesion.
[2]Percent control based on leafspot severity relative to nontreated check.
[3]1-10 scale where 1 = no spots and 10 = completely defoliated and killed by leafspot.
[4]Number of disease loci per 50 ft of linear row, where a locus = 1 or more infected plant per foot of row.
[5]Location T = Tifton/ P = Plains for all categories.

What is claimed is:

1. A method of controlling fungal disease in peanuts which comprises applying to the peanut plants or their locus in admixture or separately a fungicidally effective aggregate amount of (a) a triazole, 14-α-demethylation inhibitor and chlorothalonil.

2. A method according to claim 1 wherein the traizole fungicide is cyproconazole.

* * * * *